United States Patent [19]

Kazis et al.

[11] 4,009,051
[45] Feb. 22, 1977

[54] SOLAR POWER PACK APPARATUS

[75] Inventors: Earle W. Kazis, Rye, N.Y.; Robert Mark, Deerfield Beach, Fla.; Thomas J. Wetherell, New York, N.Y.

[73] Assignee: General Solar Power Corporation, New York, N.Y.

[22] Filed: Feb. 10, 1976

[21] Appl. No.: 656,862

[52] U.S. Cl. .......................... 320/15; 136/89 HY; 136/89 AC; 429/9; 429/48
[51] Int. Cl.² ...................................... H01M 10/00
[58] Field of Search ............... 136/3, 89, 6 R, 83 R

[56] References Cited
UNITED STATES PATENTS 3,943,726  3/1976  Miller ........................... 136/89 X

*Primary Examiner*—John H. Mack
*Assistant Examiner*—C. F. Lefevour
*Attorney, Agent, or Firm*—Bernard Malina

[57] ABSTRACT

Solar power pack apparatus adaptable for powering emergency equipment at remote locations includes a solar cell array, a rechargeable battery pack, a long shelf-life primary battery pack and switching circuitry interconnecting these elements to provide upon demand immediate and continuous supply of electrical power over extended periods of time notwithstanding environmental conditions which would render unsuitable conventional emergency-use reserve power packs.

9 Claims, 12 Drawing Figures

TYPICAL DISCHARGE CURVE OF Mg-MnO₂ BATTERY AT 72°F.

TYPICAL DISCHARGE CURVE OF Mg-MnO₂ BATTERY AT -20°F.

TYPICAL DISCHARGE CURVES OF Ni-Cad BATTERY AT VARIOUS TEMPERATURES AT THE ONE HOUR RATE

SELF DISCHARGE RATE OF Ni-Cad BATTERY AT VARIOUS TEMPERATURES

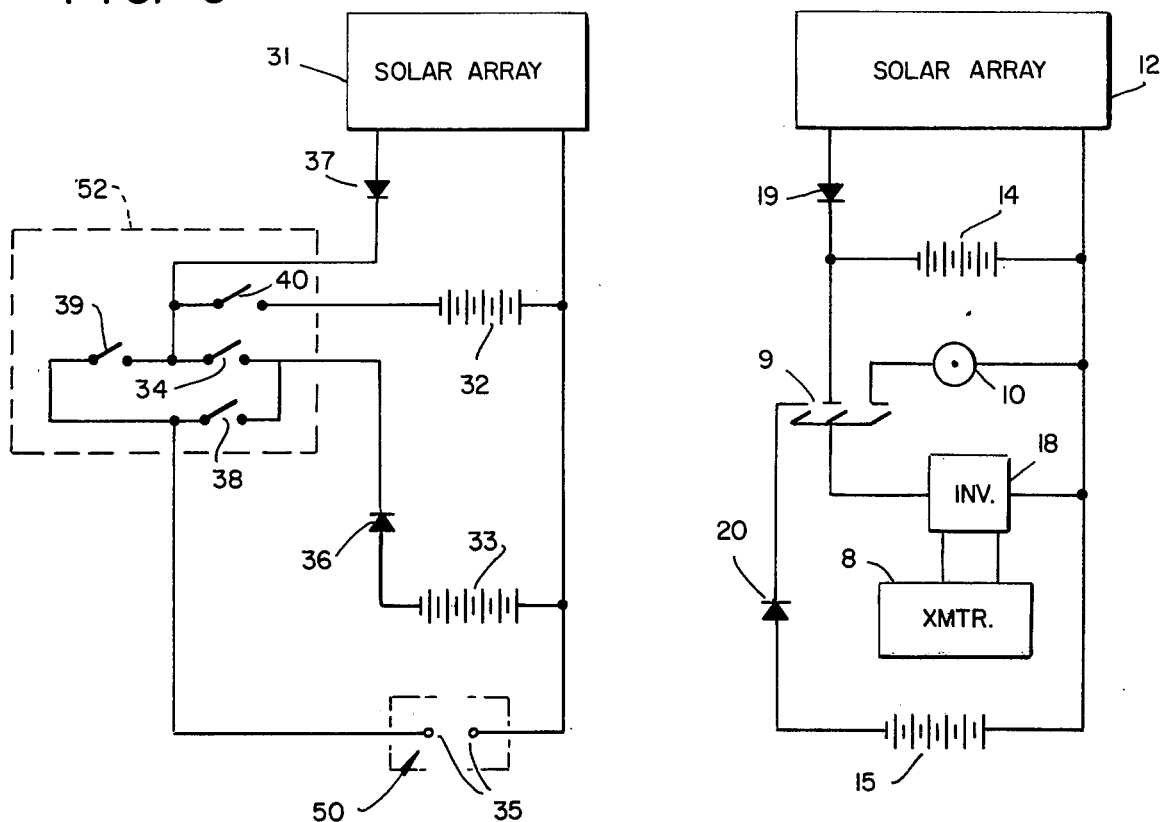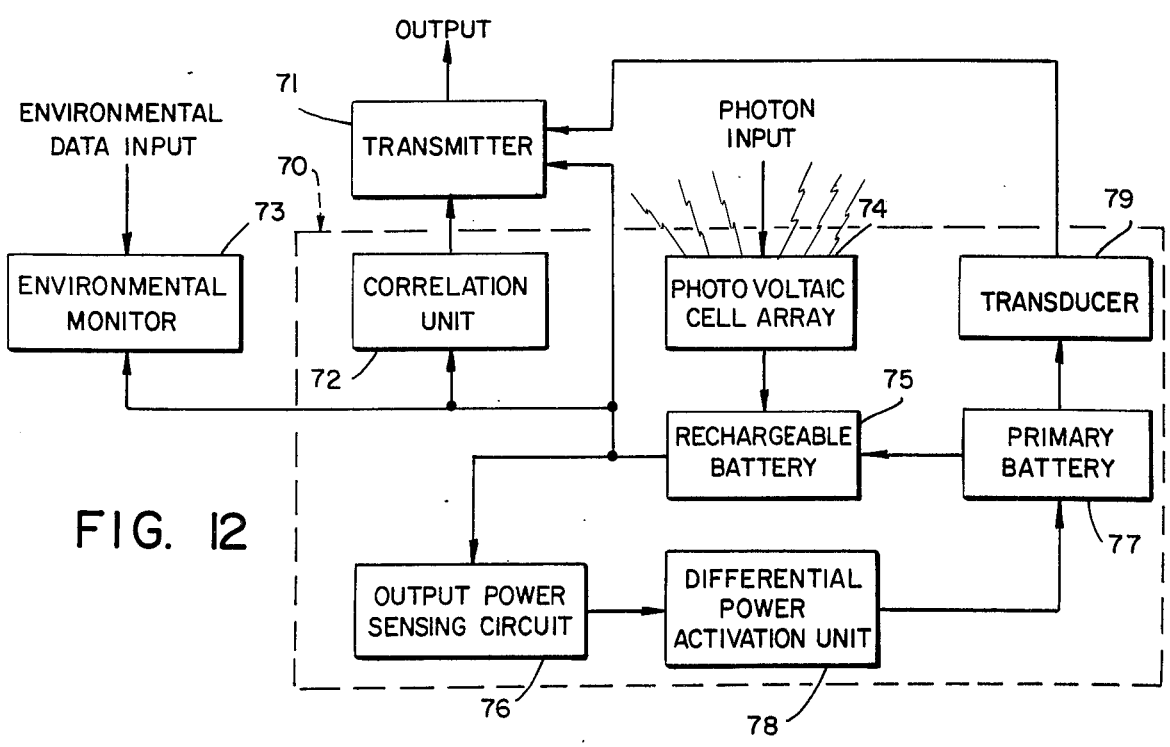

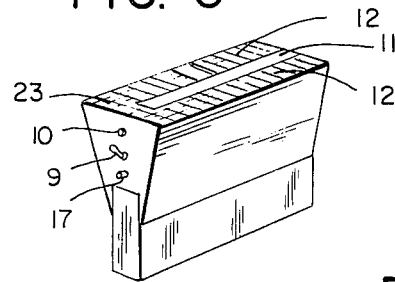
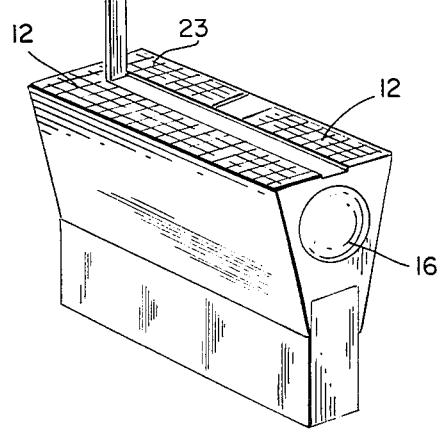
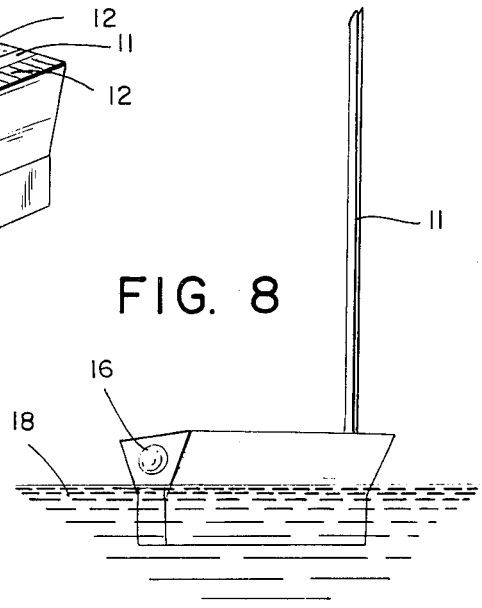
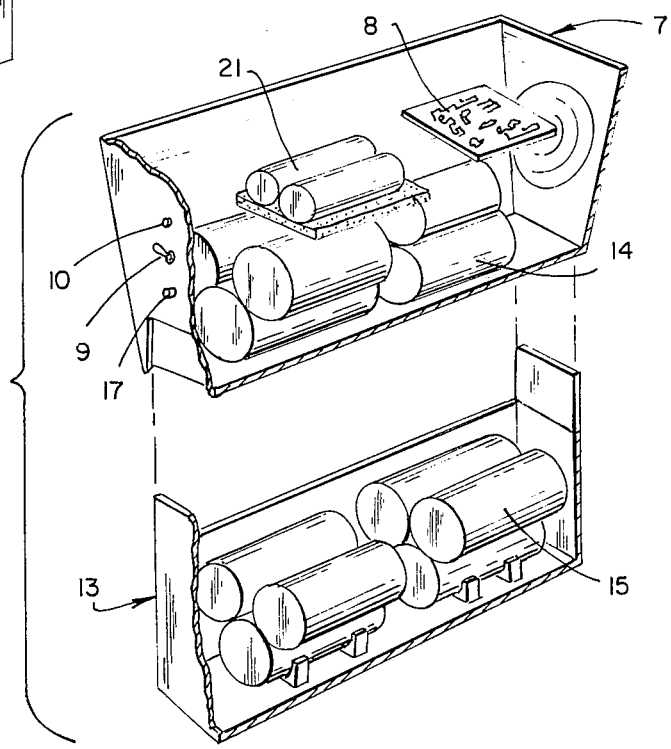
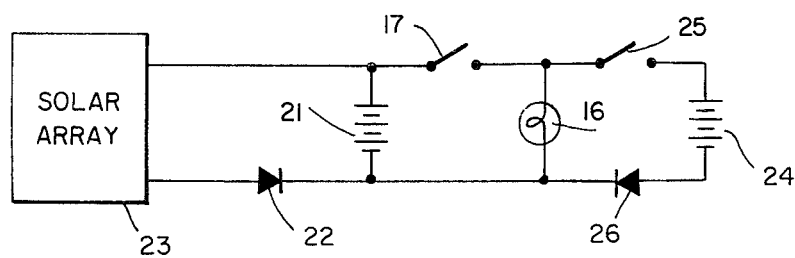

SOLAR POWER PACK APPARATUS

BACKGROUND OF THE INVENTION

The present invention relates to electrical power apparatus and more particularly to mobile electrical power apparatus operative to deliver immediate and continuous electrical power upon demand.

In remote areas where no primary source of electrical power is available, it is necessary to have a standby source of electrical power to operate equipment, particularly emergency equipment. Thus, for example, in order to summon assistance in the event of an emergency, ships and aircraft are usually provided with an emergency position indicating radio beacon which is powered by a battery pack. In such times of distress, the single-use battery pack, is usually the sole source of power and when the battery's power has been depleted after one use, the emergency equipment is rendered inoperative for want of a power source. Furthermore, since the available power of the battery deteriorates rapidly under load, particularly at elevated temperatures, an inordinately large number of batteries must be available for emergency power requirements.

It is therefore an object of the present invention to provide electrical power apparatus operative to provide immediate and continuous electrical power upon demand.

It is another object of the present invention to provide electrical power apparatus of the character described which is mobile, compact and reliable under severe environmental conditions.

It is a further object of the present invention to provide electrical power apparatus of the character described which incorporates photovoltaic cells.

It is yet a further object of the present invention to provide electrical power apparatus of the character described which has a long shelf life.

SUMMARY OF THE INVENTION

In accordance with the principles of the present invention, there is provided solar power pack apparatus comprising photovoltaic cell means, first electrochemical cell battery means in circuit with said photovoltaic cell means and second electrochemical cell battery means. The second electrochemical cell battery means has a watthour capacity sufficient to increase the watthour capacity of the first electrochemical cell battery means when said first and second electrochemical battery means are intercoupled. Further provided are electrochemical coupling means operative to selectively couple said first and second electrochemical cell battery means and electrical load terminal means adaptable for connection thereto of an electrical load in circuit with the electrical coupling means.

Further objects, features and advantages of this invention will become apparent from a consideration of the following description, the appended claims and the accompanying drawings in which:

BRIEF DESCRIPTION OF THE DRAWINGS

FIG. 5 is a schematic circuit of the present invention in one embodiment thereof;

FIG. 6 is a front perspective of an emergency position indicating floatable radio beacon incorporating the electrical power apparatus of FIG. 5 with the whip antenna in the folded position;

FIG. 7 is a rear perspective view of the emergency position indicating radio beacon of FIG. 6 showing the visual beacon and the antenna in the transmitting position;

FIG. 8 is a perspective view of the emergency position indicating radio beacon of FIGS. 6 and 7 shown floating in water with the antenna in the transmitting position;

FIG. 9 is an enlarged view similar to FIG. 8 with the boat walls partially cut away to reveal the arrangement of the rechargeable batteries, the primary batteries and the transmitter;

FIG. 10 is an electrical schematic diagram of an electrical power apparatus in accordance with the present invention in another embodiment thereof employed to power an emergency position indicating radio beacon transmitter;

FIG. 11 is an electrical schematic diagram of the electrical power apparatus of FIG. 10 employed to power a visual beacon; and FIG. 12 is a functional block diagram of a further embodiment of the present invention illustrating the application thereof to an environment monitoring station.

DETAILED DESCRIPTION OF THE INVENTION

Figure 1:
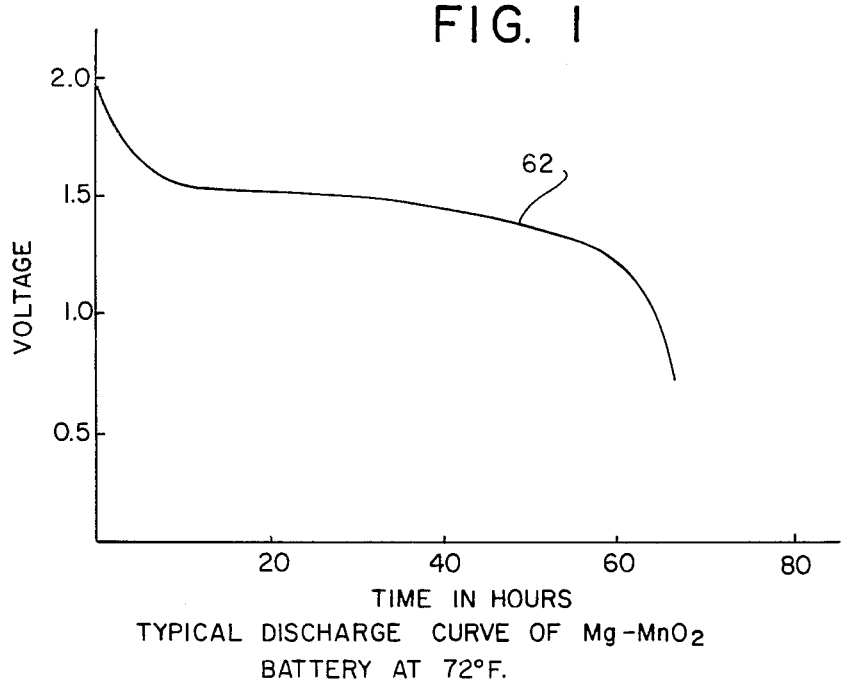
FIG. 1 is a typical discharge curve of a magnesium-manganese dioxide battery at 70° F.
Figure 2:
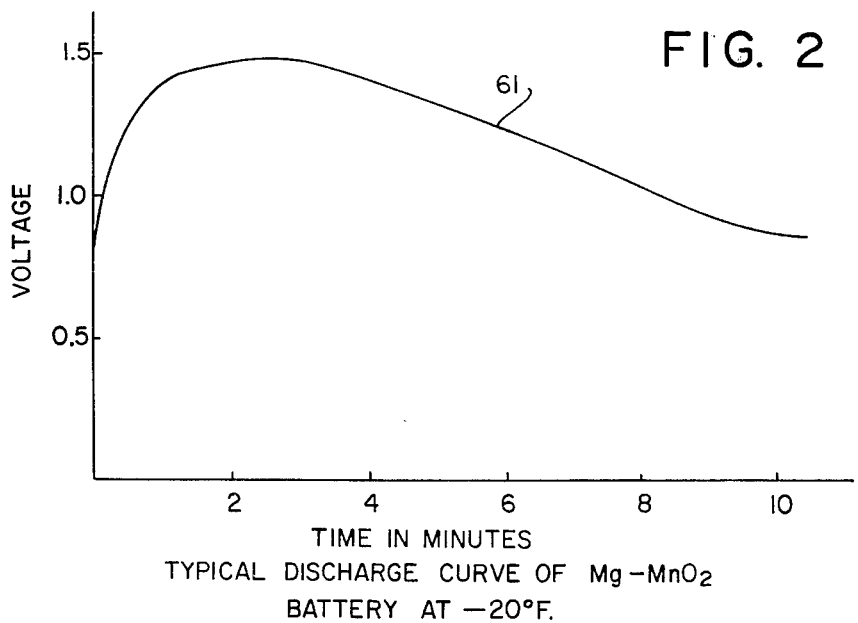
FIG. 2 is a typical discharge curve of a magnesium-manganese dioxide battery at −20° F.

There are various types of electrochemical cell batteries and photovoltaic cells suitable to power an electrical load over a wide range of environmental conditions. Primary electrochemical systems such as the manganese dioxide-zinc-alkaline cell and the magnesium-manganese dioxide-perchlorate cell operate in a satisfactory manner for a single use at temperatures above 72° F but will lose a significant amount of electrochemical watthour capacity below 60° F. FIG. 1 is a typical discharge curve for a magnesium-manganese dioxide-perchlorate electrochemical cell at 72° F. FIG. 2 is a typical discharge curve for a magnesium-manganese-perchlorate electrochemical cell at −20° F which exhibits an extremely low watthour capacity compared with FIG. 1.

Figure 3:
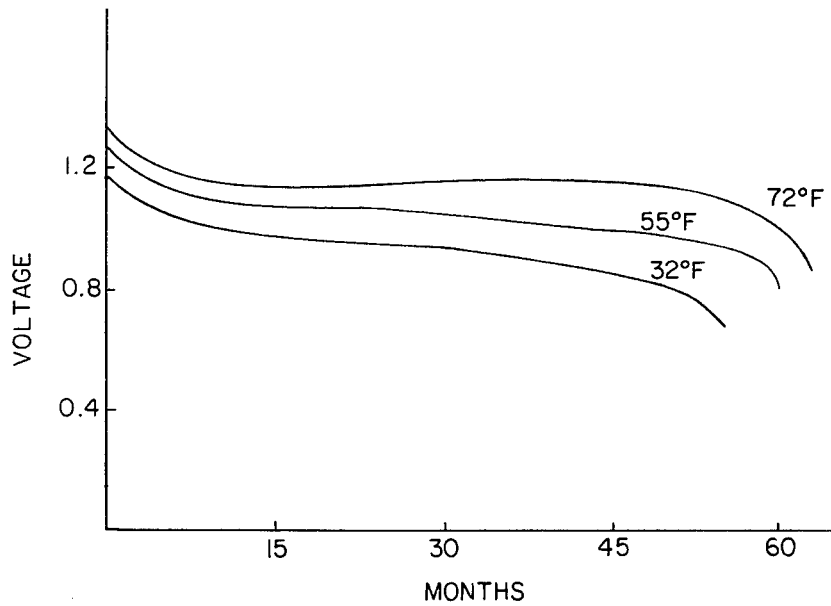
FIG. 3 is a series of discharge curves of a nickel cadmium battery at various temperatures.

Rechargeable electrochemical cells such as the nickel hydroxide-cadmium oxide-alkaline cell operate in a satisfactory manner over a wide temperature range and can be recharged for additional uses provided that a source of electrical power is available for charging. FIG. 3 shows typical discharge curves of a nickel cadmium battery at various temperatures.

Figure 4:
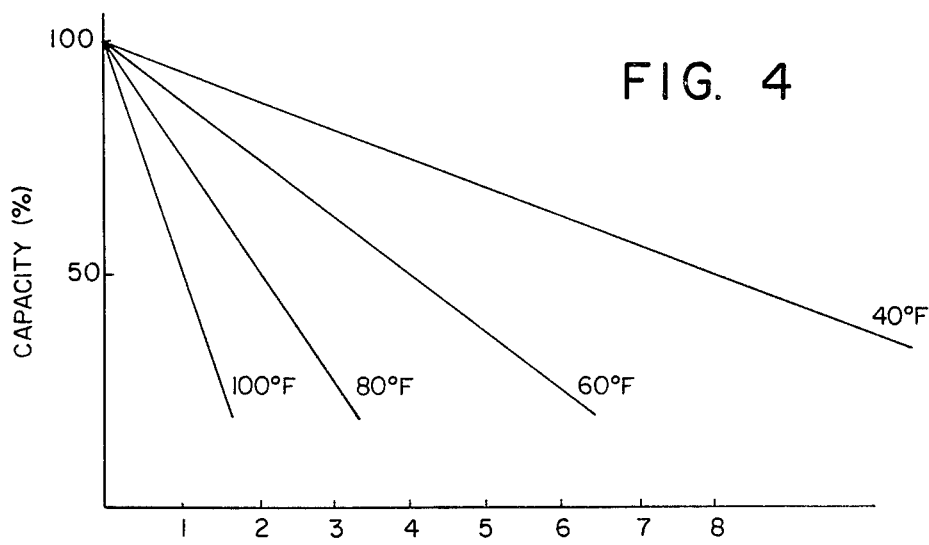
FIG. 4 is a series of self discharge curves of a nickel cadmium battery at various temperatures.

The traditional method of charging rechargeable batteries for use in remote locations is to connect the battery terminals to a source of photovoltaic electrical power such as a silicon solar cell array and to expose the solar cell array to a source of illumination such as the sun. When properly designed, such a system is capable of delivering continuous electrical power, predicated, however, on the availability of sufficient ambient illumination on a regular basis. Thus, if the system is not exposed to sufficient regular illumination the rechargeable batteries undergo self-discharge and, accordingly fail to provide initial electrical power when required. This effect is especially pronounced at elevated temperatures as shown in FIG. 4.

Although all of the above systems will provide the required electrical power under the above-described limited conditions, they are incapable of delivering continuous electrical power over a wide range of environmental conditions of use and storage. Thus, an important principle of the present invention resides in the establishment of a self-regulating combined interaction between two electrochemical cell batteries and a photovoltaic cell, as hereinafter described.

Referring to FIG. 5, a solar power pack apparatus in accordance with the present invention in one embodiment thereof is designated by the numeral 10. Power pack 10 comprises a photovoltaic cell 31 having a closed circuit photovoltaic voltage greater than that of the open circuit electrochemical potential of the electrochemical cell battery 32 to permit current flow therethrough only in the discharge condition of battery 32.

A primary electrochemical cell battery 33 having a long shelf life and a higher electrochemical potential than rechargeable battery 32 is connected so that it is in parallel with the rechargeable battery 32 when the single-pole single-throw switch 34 is in the closed position. By way of example only, rechargeable battery 32 may comprise nickel-cadmium (NiCad) cells and primary battery 33 may comprise magnesium-manganese dioxide cells. Diode 36 is connected in series with primary battery 33 to permit current flow therethrough only in the discharge condition of battery 33.

Rechargeable battery 32 provides output voltage to the electrical load terminals 35 when single-pole single-throw switch 39 is in the closed position. If rechargeable battery 32 is only minimally charged and is unable to provide the required electrical power to the electrical load terminals 35, then switch 34 is closed causing primary battery 33 to recharge battery 32.

The initial rate of charging current flow will be high because the substantial discharge state of battery 32 presents a very low impedance load to the primary battery 33. The system will work over a wide range of temperatures including very low temperatures which would normally prevent the primary battery 33 from functioning. The reason for this is that the long shelf life primary battery 33 will act as its own heater due to the high rate of discharge thus increasing the rate. In other words, the increase in the discharge rate is due to the second order electrochemical rate effects.

Referring to FIGS. 1 and 2, the voltage of the primary battery 33 would follow curve 61 if discharged through a normal load such as a lamp or a transmitter. In this case, battery 33 would deliver useable electrical capacity for only a matter of minutes. However, when primary battery 33 is connected to the low impedance load of a substantially discharged rechargeable battery 32, the heating caused by the initial high current surge causes the voltage-time characteristics of the primary battery 33 to approach that shown by the curve 62.

If immediate electrical power is required at the electrical load terminals 35, switch 38 is closed, thus further increasing the rate of flow of electrical current to load 50 from primary battery 33.

When rechargeable battery 32 has received sufficient charge from primary battery 32 to operate load 50 or when the solar cell 31 is exposed to sufficient ambient illumination to power load 50 and to charge the battery 32, switch 34 may be opened to place the primary battery 33 again in the standby position. When the switches 34, 38, 39 are in the open position and the switch 40 is in the closed position, the total output of solar cell 31 will be applied to load 50 at the electrical output terminals 35.

Switches 34, 38, 39, 40 of switch panel 52 may be operated manually in accordance with power storage and use requirements at electrical load terminals 35. Alternatively these switches may be automatically operated using solid state electronic switching circuitry which senses the requirements of the system as hereinafter described with respect to the environmental monitoring system shown in FIG. 12.

In an exemplary application thereof, electrical power apparatus 10 may be employed to power an emergency position indicating radio beacon as shown in FIGS. 6–9. Electrical power apparatus 10 is enclosed in a waterproof buoyant master circuit enclosure 7 and a waterproof buoyant booster circuit enclosure 13. Master circuit enclosure 7 houses a solid state transmitter 8 which broadcasts simultaneously on frequencies of 121.5 megahertz and 243 megahertz. Transmitter 8 is activated by the three pole single throw switch 9 mounted on one end of the master circuit enclosure 7. A light emitting diode 6 located above switch 9 indicates that the transmitter 8 is broadcasting a signal through the whip antenna 11 mounted on top of the master circuit enclosure 7.

In this embodiment, electrical power apparatus 10 comprises solar cell arrays 12 and 23 respectively mounted on the top surface of the master circuit enclosure 7, a rechargeable battery pack 14 located in the master circuit enclosure 7 and a long life primary battery pack 15 housed in booster circuit enclosure 13. A lamp 16 which is ordinarily powered by rechargeable battery pack 21 is mounted on one end of the master circuit enclosure 7 and is selectively energized by a manual operation of a single pole-single-throw switch 17 which is mounted on the end of the master circuit enclosure 7 opposite lamp 16. Whip antenna 11 folds flat across the top of the master circuit enclosure 7 when not in use. When in use, the buoyancy of the master circuit enclosure 7 which may be made of conventional buoyant material allows it to float upright in water 18.

Referring to FIGS. 5 and 6, transmitter 8 may be operated through any of the combined outputs of the 3 watt solar cell array 12, the five nickel cadmium D cell rechargeable battery 14 and the long-life six cell magnesium-manganese dioxide CD cell primary battery 15. An inverter 18 supplies the 12 volts required to operate the transmitter 8. A diode 19 prevents electrical current from discharging into the solar cell array 12 when the ambient illumination is at a level where the terminal voltage of rechargeable battery 14 or the primary battery 15 is greater than the terminal voltage of solar array 12. Diode 20 insures that electrical current will not flow from rechargeable battery 14 into primary battery 15 when the terminal voltage of primary battery 15 falls below the open circuit voltage of rechargeable battery 14 or solar cell array 12.

Three-pole single-throw switch 9 closes the circuit between the inverter 18 and the solar cell array 12, rechargeable battery 14 and the primary battery 15. Light emitting diode 10 is provided to indicate that power is being supplied to inverter 18 and transmitter 8. Lamp 16 which is activated by a single-pole single-throw switch 17 is powered by a rechargeable battery 21. Solar cell array 23 charges rechargeable battery 21 when the ambient illumination generates a photovoltaic voltage which is greater than the open circuit voltage of rechargeable battery pack 21 and is sufficiently large to overcome the voltage drop across diode 22.

In another embodiment of the present invention as shown in FIG. 12, solar power pack apparatus generally designated by the numeral 10 is used to provide continuous electrical power to operate a remote environmental monitoring station 73. Environmental data collected by environmental monitor 73 is then correlated by a correlation unit 72, the coded data then being fed into a transmitter 71 for broadcast to a central receiving station (not shown).

Solar power pack apparatus 70 comprises a photovoltaic cell array (i.e. solar array) 74, rechargeable battery 75, long shelf-life primary battery 77, output power sensing circuit 76, differential power activation unit 78 and transducer 79. Solar cell array 74 is positioned so that it is exposed to maximum illumination from the sun. As a result of such illumination d.c. current flows through rechargeable battery 75, environmental monitor 73, correlation unit 72 and to transmitter 71. The power input from solar cell array 74 to rechargeable battery 75 is sufficiently high to provide storage power for the latter to power the system during times of low ambient illumination.

The output power of rechargeable battery 75 is monitored and regulated by the output power sensing circuit 76. If the output power of rechargeable battery 75 falls below a predetermined level, sensing circuit 76 signals the differential power activation unit 78 to activate the primary battery 77 to supply the differential electrical power required to bring power to the minimum predetermined level. Primary battery 77 simultaneously signals the transducer 79 to broadcast a signal to a central receiving station indicating the level of differential power being used as a result of switching to the standby mode of operation. This signal will indicate that the environmental system is in need of maintenance and the remaining period of time that the system is expected to continue to be powered by primary battery 77.

As explained in the foregoing description of the various embodiments thereof, an important feature of the present invention resides in the fact that it provides a source of continuous electrical power to power electrical apparatus under adverse environmental conditions. The various embodiments described above have a long shelf-life capability in addition to a long operating life under load. Although not limited to such applications, these characteristics make these and other similar embodiments not specifically described hereinabove particularly suitable for powering emergency equipment under adverse environmental conditions at remote locations, such as the emergency position indicating radio beacon described above.

Although the invention has been described with reference to particular embodiments thereof, it is to be understood that such embodiments are merely illustrative of the application of the principles of the invention. Numerous modifications may be made therein and other arrangements may be devised without departing from the spirit and scope of the invention.

What is claimed is:

1. Solar power pack apparatus comprising: photovoltaic cell means; first electrochemical cell battery means in circuit with said photovoltaic cell means; second electrochemical cell battery means having a watthour capacity sufficient to increase the watthour capacity of said first electrochemical cell battery means when said second electrochemical cell battery means is electrically coupled to said first electrochemical cell battery means; electrical coupling means operative to selectively couple said first and second electrochemical cell battery means; and electrical load terminal means adaptable for connection thereto of an electrical load in circuit with said electrical coupling means.

2. Solar power pack apparatus as defined in claim 1 wherein said electrical coupling means comprises first switch means operative when rendered into the closed condition to connect said second electrochemical battery means to said electrical load terminals.

3. Solar power pack apparatus as defined in claim 2 wherein said electrical coupling means comprises second and third switch means; said electrical coupling means being operative, when said first, second and third switch means are respectively in the closed condition to interconnect said photovoltaic cell means, said first electrochemical cell battery means and said second electrochemical cell battery means and said electrical load terminal means in parallel arrangement.

4. Solar power pack apparatus as defined in claim 3 wherein said electrical coupling means comprises fourth switch means; said electrical coupling means being operative, when said fourth switch means is in the closed condition, said first, second and third switch means are respectively in the open condition to exclusively interconnect said photovoltaic cell means to said electrical load terminal means.

5. Solar power pack apparatus as defined in claim 4 wherein said electrical coupling means is operative to respectively interconnect said photovoltaic cell means, first electrochemical cell battery means and electrical load terminal means in parallel arrangement.

6. Solar power pack apparatus as defined in claim 4 wherein said electrical coupling means is operative to respectively interconnect said photovoltaic cell means, said first electrochemical cell means and said second electrochemical cell means in parallel when said second and third switch means are respectively closed and said first and fourth switch means are respectively open.

7. Solar power pack apparatus as defined in claim 4 wherein said electrical coupling means is operative to connect said photovoltaic cell means across said first electrochemical battery cell means when said first, second and fourth switch means are respectively in the open condition and said third switch means is in the closed condition.

8. Solar power pack apparatus as defined in claim 1 including first unidirectional conducting means connected in series with said photovoltaic cell means and poled to allow current flow therethrough in the discharge direction of said photovoltaic cell means.

9. Solar power pack apparatus as defined in claim 1 including second unidirectional conducting means connected in series with said second electrochemical battery cell means and poled to allow current flow therethrough in the discharge direction of said second electrochemical battery cell means.

* * * * *